US008762148B2

(12) United States Patent
Onishi

(10) Patent No.: US 8,762,148 B2
(45) Date of Patent: Jun. 24, 2014

(54) REFERENCE PATTERN ADAPTATION APPARATUS, REFERENCE PATTERN ADAPTATION METHOD AND REFERENCE PATTERN ADAPTATION PROGRAM

(75) Inventor: Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1422 days.

(21) Appl. No.: 12/280,563

(22) PCT Filed: Feb. 16, 2007

(86) PCT No.: PCT/JP2007/052865
§ 371 (c)(1),
(2), (4) Date: Aug. 25, 2008

(87) PCT Pub. No.: WO2007/105409
PCT Pub. Date: Sep. 20, 2007

(65) Prior Publication Data
US 2009/0012791 A1  Jan. 8, 2009

(30) Foreign Application Priority Data

Feb. 27, 2006  (JP) .................................. 2006-050152

(51) Int. Cl.
*G10L 15/14*  (2006.01)
*G10L 15/20*  (2006.01)
(52) U.S. Cl.
USPC .......................................... 704/244; 704/256
(58) Field of Classification Search
USPC ............................ 704/244, 250, 256.1, 256.2
See application file for complete search history.

(56) References Cited

U.S. PATENT DOCUMENTS

| 5,651,094 | A | * | 7/1997 | Takagi et al. | 704/244 |
| 5,778,340 | A | * | 7/1998 | Hattori | 704/244 |
| 5,819,223 | A | * | 10/1998 | Takagi | 704/256.1 |
| 5,835,890 | A | * | 11/1998 | Matsui et al. | 704/255 |
| 6,003,002 | A | * | 12/1999 | Netsch | 704/236 |
| 6,073,096 | A | * | 6/2000 | Gao et al. | 704/245 |
| 6,151,574 | A | * | 11/2000 | Lee et al. | 704/256 |

(Continued)

FOREIGN PATENT DOCUMENTS

| CN | 1588538 | 3/2005 |
| JP | 9-114482 | 5/1997 |

OTHER PUBLICATIONS

Leggetter et al. "Maximum likelihood linear regression for speaker adaptation of continuous density hidden Markov models", Computer Speech and Language, vol. 9, 1995.*
Chinese Official Action—200780006994.6—Oct. 12, 2010.

(Continued)

*Primary Examiner* — Jialong He
(74) *Attorney, Agent, or Firm* — Young & Thompson

(57) ABSTRACT

A method and apparatus for carrying out adaptation using input speech data information even at a low reference pattern recognition performance. A reference pattern adaptation device 2 includes a speech recognition section 18, an adaptation data calculating section 19 and a reference pattern adaptation section 20. The speech recognition section 18 calculates a recognition result teacher label from the input speech data and the reference pattern. The adaptation data calculating section 19 calculates adaptation data composed of a teacher label and speech data. The adaptation data is composed of the input speech data and the recognition result teacher label corrected for adaptation by the recognition error knowledge which is the statistical information of the tendency towards recognition errors of the reference pattern. The reference pattern adaptation section 20 adapts the reference pattern using the adaptation data to generate an adaptation pattern.

12 Claims, 6 Drawing Sheets

(56) References Cited

U.S. PATENT DOCUMENTS

| | | | |
|---|---|---|---|
| 6,173,076 B1* | 1/2001 | Shinoda | 382/226 |
| 6,205,426 B1* | 3/2001 | Nguyen et al. | 704/255 |
| 6,223,159 B1* | 4/2001 | Ishii | 704/256.7 |
| 6,389,394 B1 | 5/2002 | Fanty | |
| 6,799,162 B1* | 9/2004 | Goronzy et al. | 704/244 |
| 6,879,956 B1* | 4/2005 | Honda et al. | 704/244 |
| 6,882,972 B2* | 4/2005 | Kompe et al. | 704/255 |
| 6,961,702 B2* | 11/2005 | Dobler et al. | 704/244 |
| 7,031,918 B2* | 4/2006 | Hwang | 704/243 |
| 7,065,488 B2* | 6/2006 | Yajima et al. | 704/255 |
| 7,580,836 B1* | 8/2009 | Yan | 704/244 |
| 2002/0062212 A1* | 5/2002 | Nakatsuka | 704/240 |
| 2002/0128820 A1 | 9/2002 | Goronzy et al. | |
| 2002/0143540 A1* | 10/2002 | Malayath et al. | 704/256 |
| 2003/0191639 A1* | 10/2003 | Mazza | 704/231 |
| 2004/0093210 A1* | 5/2004 | Toyama | 704/233 |
| 2004/0230420 A1* | 11/2004 | Kadambe et al. | 704/205 |
| 2004/0243412 A1* | 12/2004 | Gupta et al. | 704/254 |
| 2005/0246171 A1* | 11/2005 | Nakatsuka | 704/239 |
| 2005/0256714 A1* | 11/2005 | Cui et al. | 704/256.4 |

OTHER PUBLICATIONS

Yoshifumi Onishi et al; Speaker Adaptation by Hierarchical Eigenvoice; Multimedia Research Laboratories, NEC Corporation, 4-1-1 Miyazaki, Miyamae-ku, Kawasaki, 216-8555 Japan; γ-onishi@bp.jp.nec.com,k-iso@bx.jp.nec.com; pp. I-576-I579, Published 2003.

International Search Report dated May 22, 2007 in PCT Application.

* cited by examiner

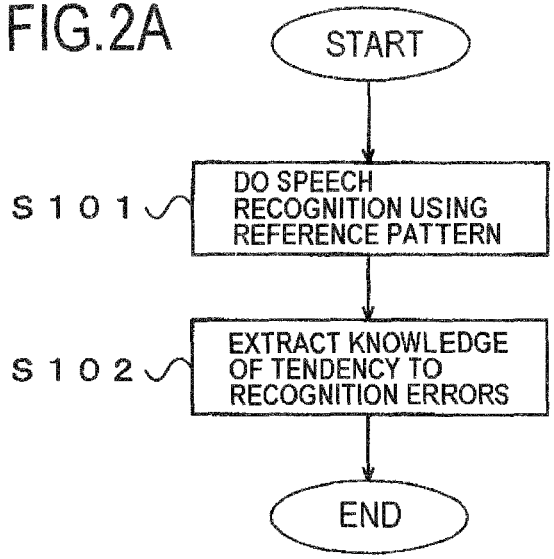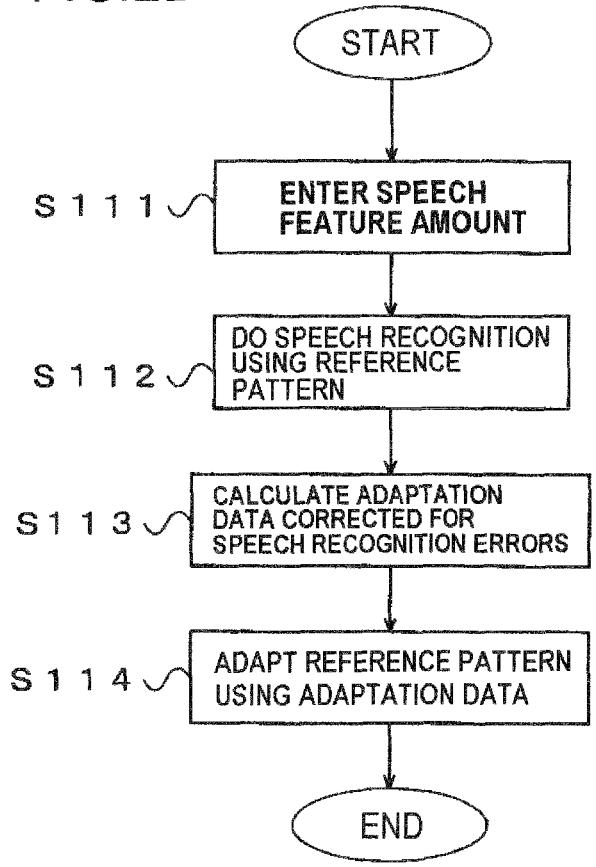

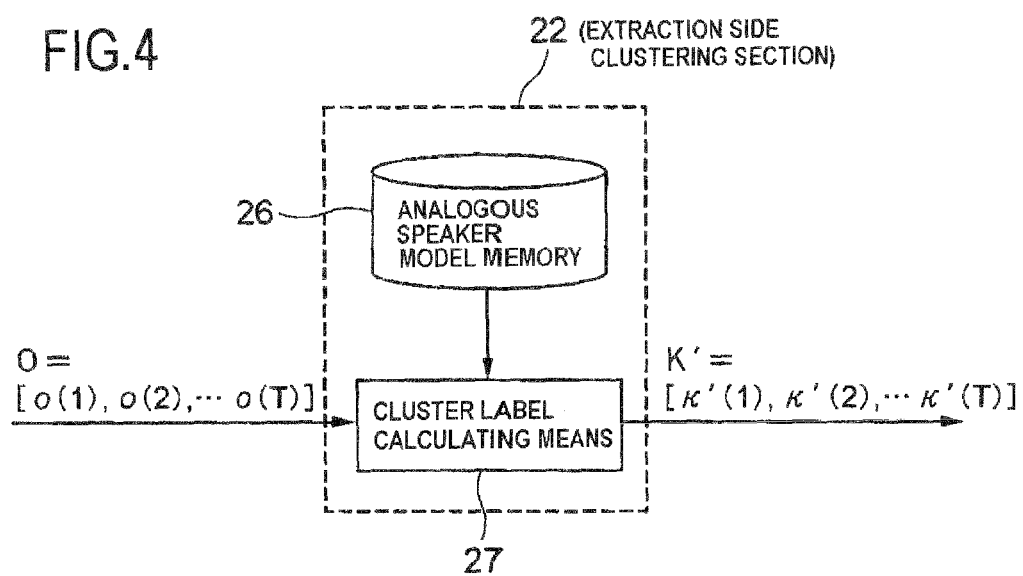

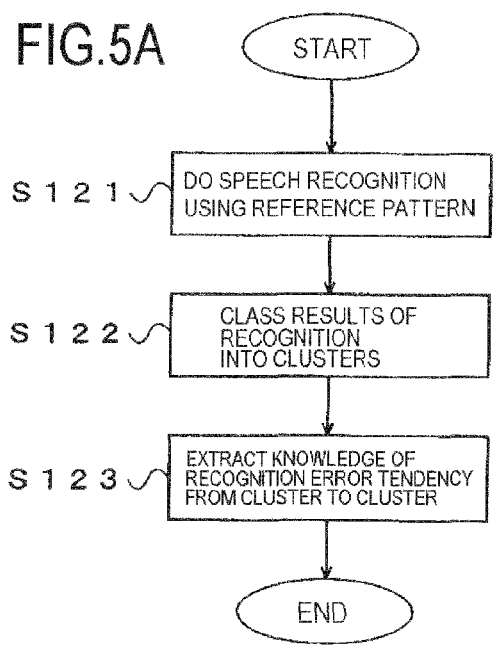
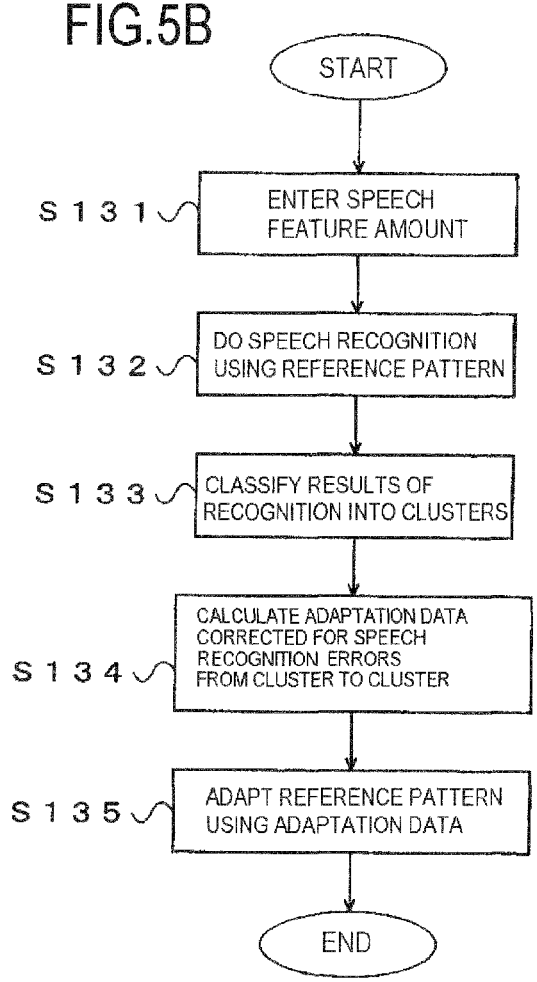

REFERENCE PATTERN ADAPTATION APPARATUS, REFERENCE PATTERN ADAPTATION METHOD AND REFERENCE PATTERN ADAPTATION PROGRAM

TECHNICAL FIELD

This invention relates to a reference pattern adaptation technique for adapting a speech recognition reference pattern to speakers or to environments. More particularly, it relates to a data generating method useful for unsupervised (teacherless) adaptation and to a reference pattern adaptation method etc. that makes use of updated data.

BACKGROUND ART

An instance of a conventional method for speech recognition reference pattern adaptation is described in Patent Publication 1. A conventional apparatus for speech recognition reference pattern adaptation 200, shown in FIG. 6, includes a speech feature input section 201, a reference pattern memory 202, a speech recognition means 203, a reliability factor calculating means 204, a reference pattern adaptation means with the reliability factor 205, and an adaptation pattern memory 206.

The operation of the apparatus for speech recognition reference pattern adaptation 200, arranged as described above, is now explained. A string of feature amount of speech, used for adaptation, is delivered to the speech feature amount input section 201. The speech recognition means 203 recognizes this string of feature amount as speech, using reference patterns stored in the reference pattern memory 202, and outputs the results of recognition. The reliability factor calculating means 204 calculates the factor of reliability for the case of using the results of recognition as a teacher label of the input feature amount string.

The reference pattern adaptation means with reliability factor 205 accords weight, depending on the factor of reliability, using the feature amount string, teacher label and the reliability factor, for adaptation of the reference patterns to the input string of features.

The reference pattern adaptation means with reliability factor 205 is now explained.

In case the reference pattern is a Hidden Markov Model, referred to below as HMM, now in extensive use for speech recognition, and a mean vector of the Gaussian distribution is adapted as HMM parameter, an input feature amount string at time t=1, 2, ..., T $$O=[o(1),o(2),\ldots,o(T)] \quad \text{[Equation 1]}$$

a Gaussian distribution sequence, obtained by the reliability factor calculating means 204, equation 2:

$$L=[l(1),l(2),\ldots,l(T)] \quad \text{[Equation 2]}$$

which is of the highest likelihood as a teacher label and a reliability factor $$S=[s(1),s(2),\ldots,s(T)] \quad \text{[Equation 3]}$$

are used to calculate, for a label q=l(t) at time t, the adaptation data corrected by weighting that makes use of the reliability factor, as shown by the equation (4):

$$o'(t,q) = \frac{s(t)}{\tau+s(t)}o(t) + \frac{\tau}{\tau+s(t)}\mu(q), q=1(t) \quad \text{[Equation 4]}$$

where μ(q) denotes a mean vector of the Gaussian distribution for the label q, and τ is a control constant having a value not smaller than 0.

By adapting the reference pattern, with the use of the so corrected adaptation data, it is possible to reduce the effect of speech data having a low reliability factor and to calculate an adaptation pattern in which the adverse effect of the error in the teacher label, that is, the error in the results of recognition, is diminished.

As an instance of the method for forming a correct solution teacher label, the Viterbi algorithm is indicated in Non-Patent Publication 1.

As examples of techniques for reference pattern adaptation, MAP (Maximum A Posteori) adaptation. MLLR (Maximum Likelihood Linear Regression) adaptation, AMCC (Autonomus Model Complexity Control) adaptation and EigenVoice adaptation are disclosed in Non-Patent Publication 2. On the other hand, HEV (Hierarchical EigenVoice) adaptation is disclosed in Non-Patent Publication 3.

Patent Publication 1: JP Patent 3589044
Non-Patent Publication 1: Rabiner B and H. Juang, Foundation of Speech Recognition, NTT Advance Technology KK, 1995
Non-Patent Publication 2: Koichi SHINODA, Speaker Adaptation Techniques for Speech Recognition Using Probabilistic Models, IEICE, 2004, Vol. J87-D-II, No. 2, pp. 371-386
Non-Patent Publication 3: Y. Onishi and K. Iso, "Speaker Adaptation by Hierarchical Eigenvoice", Proc. ICASSP-2003, pp. I-576-579, 2003

DISCLOSURE OF THE INVENTION

Problem to be Solved by the Invention

The disclosures of the above Publications are incorporated herein by reference thereto.

A first problem of the conventional method for speech recognition reference pattern adaptation is that the information on input speech features may not fully be utilized for reference pattern adaptation. The reason is that only speech data with a high reliability factor influences the adaptation, while the information of speech data with a low reliability factor is not used. The result is that only part of the input information is used for the adaptation without the information on the speech data of the low reliability factor being used.

A second problem of the conventional method for speech recognition reference pattern adaptation is that, if the recognition performance of the original reference pattern is low, the adaptation performance is also low. The reason is that, if the recognition performance is low, the reliability factor is low, and hence the reference pattern may not be fully utilized, with the performance remaining low.

It is an object of the present invention to provide a method etc. in which, even if the recognition performance of the original reference pattern is low, adaptation may be performed sufficiently utilizing the input speech information.

Means to Solve the Problem

The present invention provides the following means for solution:

A method for reference pattern adaptation according to the present invention comprises a speech recognition step of calculating a recognition result teacher label using input speech data and a reference pattern, and an adaptation data calculating step of calculating adaptation data composed of speech data and a recognition result teacher label. The adaptation data is composed of the input speech data and the recognition result teacher label as corrected for adaptation by the recognition error knowledge which is the statistical information of the tendency towards recognition errors of the reference pattern. The method also comprises a reference pattern adaptation step of adapting the reference pattern using the adaptation data to generate an adaptation pattern (claims 1 to 4).

In the above pattern adaptation method, the adaptation data calculating step calculates adaptation data, which has been corrected using the recognition error knowledge of the results of recognition of the input speech data. The reference pattern adaptation step uses the so calculated adaptation data for adapting the reference pattern. Hence, the erroneous portion of the results of recognition of the input speech data may be corrected by the recognition error knowledge and may thus be used effectively for adaptation. The result is that the input speech data information may be used sufficiently, such that, even if recognition accuracy is locally inferior, reference pattern adaptation may be achieved effectively.

The above reference pattern adaptation method may further comprise an extraction side speech recognition step of recognizing the speech from the speech data, prior to the adaptation data calculating step, to calculate a recognition result label, and a recognition error knowledge calculating step of statistically analyzing a correct solution teacher label, composed of an error-free teacher label, and the recognition result label, to calculate the recognition error knowledge (claim 2). By so doing, the recognition error knowledge may be extracted using the correct solution teacher label and the results of speech recognition.

The above reference pattern adaptation method may further comprise a clustering step of classifying (or grouping) the input speech data and the recognition result teacher label each into a plurality of clusters. The adaptation data calculating step may calculate the adaptation data, by cluster-based recognition error knowledge, using the input speech data and the recognition result teacher label each classified into clusters (claim 3). By so doing, the recognition error knowledge may be extracted in detail from cluster to cluster, such that reference pattern adaptation may be achieved more effectively than in case of not performing the clustering.

The above reference pattern adaptation method may further comprise an extraction side speech recognition step, an extraction side clustering step and a recognition error knowledge extracting step. The extraction side speech recognition step recognizes the speech from the speech data, prior to the adaptation data calculating step, to calculate a recognition result label. The extraction side clustering step classifies (or groups) the speech data and the recognition result label each into a plurality of clusters. The recognition error knowledge extracting step statistically analyzes a correct solution teacher label, composed of an error-free teacher label, and the recognition result label, from one cluster of the recognition result label to another, and calculates the recognition error knowledge, which is the statistical information of the tendency towards recognition errors of the reference pattern (claim 4). By so doing, the recognition error knowledge may be extracted from cluster to cluster through utilization of the correct solution teacher label and the result of speech recognition.

A program for reference pattern adaptation according to the present invention causes a computer to execute a speech recognition function of calculating a recognition result teacher label, using input speech data and a reference pattern, and an adaptation data calculating function of calculating adaptation data composed of a teacher label and speech data. The adaptation data is composed of the input speech data and the recognition result teacher label as corrected for adaptation by the recognition error knowledge which is the statistical information of the tendency towards recognition errors of the reference pattern.

The program according to the present invention also causes the computer to execute a reference pattern adaptation function of adapting the reference pattern using the adaptation data to generate an adaptation pattern (claims 5 to 8).

With the above pattern adaptation program, the adaptation data calculating function calculates adaptation data as corrected using the recognition error knowledge of the results of recognition of the input speech data. The reference pattern adaptation function uses the so calculated adaptation data for adapting the reference pattern. Hence, the erroneous portion of the results of recognition of the input speech data may be corrected by the recognition error knowledge and may thus be used effectively for adaptation. The result is that the input speech data information may be used sufficiently, such that, even if recognition accuracy is locally inferior, the reference pattern may be adapted effectively.

The above reference pattern adaptation program may cause a computer to further execute an extraction side speech recognition function and a recognition error knowledge calculating function. The extraction side speech recognition function recognizes the speech from the speech data, prior to the adaptation data calculating function, to calculate a recognition result label. The recognition error knowledge calculating function statistically analyzes a correct solution teacher label, composed of an error-free teacher label, and the recognition result label, to calculate the recognition error knowledge (claim 6). By so doing, the recognition error knowledge may be extracted using the correct solution teacher label and the results of speech recognition.

The above reference pattern adaptation program may cause a computer to further execute a clustering function of classifying (or grouping) the input speech data and the recognition result teacher label each into a plurality of clusters. The adaptation data calculating function calculates the adaptation data, by cluster-based recognition error knowledge, using the input speech data and the recognition result teacher label each classified into the clusters (claim 7). By so doing, the recognition error knowledge may be extracted in detail from cluster to cluster such that reference pattern adaptation may be achieved more effectively than in case of not performing the clustering.

The above reference pattern adaptation program may cause a computer to further execute an extraction side speech recognition function, a recognition error knowledge extracting function and a recognition error knowledge extracting function. The extraction side speech recognition function recognizes the speech from the speech data, prior to the adaptation data calculating function, to calculate a recognition result label. The extraction side clustering function classifies the speech data and the recognition result label each into a plurality of clusters. The recognition error knowledge extracting function statistically analyzes a correct solution teacher label, composed of an error-free teacher label, and the recognition result label, from one cluster of the recognition result label to another, to calculate the recognition error knowledge which is the statistical information of the tendency towards recognition errors of the reference pattern (claim 8). By so doing, the recognition error knowledge may be extracted from cluster to cluster through utilization of the correct solution teacher label and the results of speech recognition.

An apparatus for reference pattern adaptation according to the present invention comprises a speech recognition section for calculating a recognition result teacher label, using input speech data and a reference pattern, and an adaptation data calculating section for calculating adaptation data composed of a teacher label and speech data. The adaptation data is composed of the input speech data and the recognition result teacher label, corrected for adaptation by the recognition error knowledge which is the statistical information of the tendency towards recognition errors of the reference pattern. The apparatus also comprises a reference pattern adaptation section for adapting the reference pattern using the adaptation data to generate an adaptation pattern (claims 9 to 12).

With the above reference pattern adaptation apparatus, the adaptation data calculating section calculates adaptation data which has been corrected using the recognition error knowledge of the results of recognition of the input speech data. The reference pattern adaptation section uses the so calculated adaptation data for adaptation of the reference pattern. The erroneous portion of the results of recognition of the input speech data may thus be corrected by the recognition error knowledge and used effectively for adaptation, and hence the input speech data information may be used sufficiently. That is, even if recognition accuracy is locally inferior, the reference pattern may be adapted effectively.

The above pattern adaptation apparatus may further comprise an extraction side speech recognition section and a recognition error knowledge calculating section. The extraction side speech recognition section recognizes the speech from the speech data to calculate a recognition result label, and the recognition error knowledge calculating section statistically analyzes a correct solution teacher label, composed of an error-free teacher label, and the recognition result label, to calculate the recognition error knowledge (claim 10). By so doing, the recognition error knowledge may be extracted from cluster to cluster through utilization of the correct solution teacher label and the results of speech recognition.

The above pattern adaptation apparatus may further comprise a clustering section for classifying (or grouping) the input speech data and the recognition result teacher label each into a plurality of clusters. The adaptation data calculating section calculates the adaptation data, by the cluster-based recognition error knowledge, using the input speech data and the recognition result teacher label each classified into the clusters (claim 11). By so doing, the recognition error knowledge may be extracted in detail from cluster to cluster such that reference pattern adaptation may be achieved more effectively than in case of not performing the clustering.

The above pattern adaptation apparatus may further comprise an extraction side speech recognition section, an extraction side clustering section and a recognition error knowledge extracting section. The extraction side speech recognition section recognizes the speech from the speech data to calculate a recognition result label. The extraction side clustering section classifies the speech data and the recognition result label each into a plurality of clusters. The recognition error knowledge extracting section statistically analyzes a correct solution teacher label, composed of an error-free teacher label, and the recognition result label, from one cluster of the recognition result label to another, to calculate the recognition error knowledge, which is the statistical information of the tendency towards recognition errors of the reference pattern (claim 12). By so doing, the recognition error knowledge may be extracted from cluster to cluster through utilization of the correct solution teacher label and the results of speech recognition.

The present invention provides the following effect.

According to the present invention, the adaptation data, obtained on correcting the results of recognition of the input speech data using the recognition error knowledge, is calculated and used for adapting the reference pattern. The erroneous portion of the results of recognition of the input speech data may thus be corrected by the recognition error knowledge and used effectively for adaptation, with the result that the input speech data information may be used sufficiently. That is, even if recognition accuracy is locally inferior, the reference pattern may be adapted effectively.

BRIEF DESCRIPTION OF THE DRAWINGS

FIG. 2A is a flowchart for illustrating the operation of a recognition error knowledge extraction device of FIG. 1.

FIG. 2B is a flowchart for illustrating the operation of a reference pattern adaptation device of FIG. 1.

FIG. 4 is a schematic view showing an instance of a formulation of an extraction side clustering section of FIG. 3.

FIG. 5A is a flowchart for illustrating the operation of the recognition error knowledge extraction device of FIG. 3.

FIG. 5B is a flowchart for illustrating the operation of the reference pattern adaptation device of FIG. 3.

EXPLANATION OF NUMERALS

Figure 1:
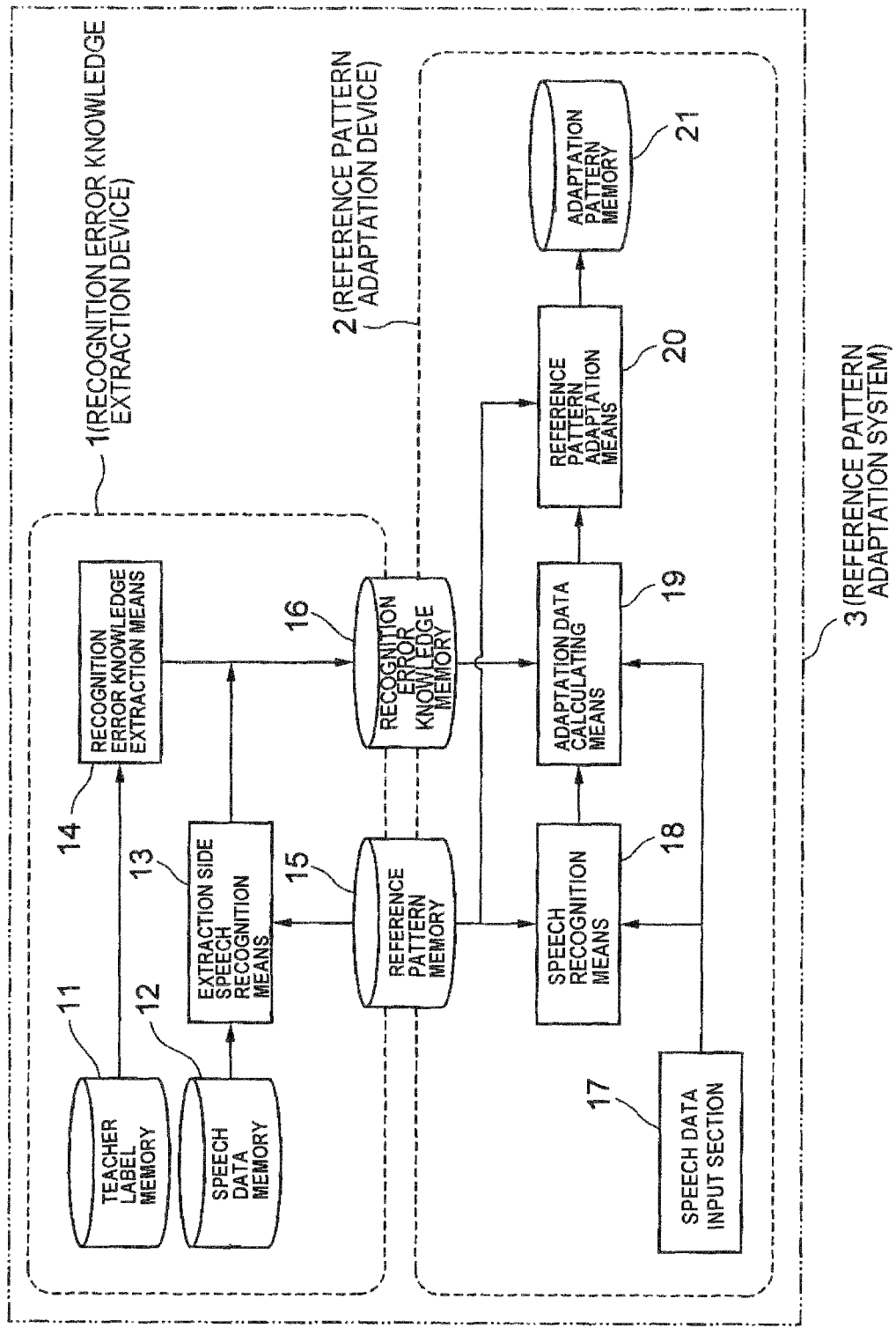
FIG. 1 is a schematic view showing a formulation of a reference pattern adaptation system according to a first exemplary embodiment of the present invention.

1, 4 recognition error knowledge extraction devices
2, 5 reference pattern adaptation devices
3, 6 reference pattern adaptation systems
11 teacher label memory
12 speech data memory
13 extraction side speech recognition means
14, 23 recognition error knowledge extracting means
15 reference pattern memory
16 recognition error knowledge memory
17 speech data input section
18 speech recognition means
19, 25 adaptation data calculation means
20 reference pattern adaptation means
21 adaptation pattern memory
22 extraction side clustering section
24 clustering section
26 analogous speaker model memory
27 cluster label calculating section

PREFERRED MODES FOR CARRYING OUT THE INVENTION

The formulation and the operation of the reference pattern adaptation system 3 according to a first exemplary embodiment of the present invention are now described with reference to the drawings. FIG. 1 is a block diagram of the reference pattern adaptation system 3 (an instance of the reference pattern adaptation device). The reference pattern adaptation system 3 is made up of a recognition error knowledge extraction device 1 and a reference pattern adaptation device 2.

The recognition error knowledge extraction device 1 is e.g. a personal computer, and includes a teacher label memory 11, a speech data memory 12, an extraction side speech recognition means 13, a recognition error knowledge extraction means 14, a reference pattern memory 15 and a recognition error knowledge memory 16. These means etc. may be implemented by having a CPU (Central Processing Unit) of the recognition error knowledge extraction device 1 execute a reference pattern execution program to control the hardware of the recognition error knowledge extraction device 1.

The reference pattern memory 15 is e.g. a hard disc device or a memory, and has stored therein a plurality of reference patterns each of which is a pre-trained acoustic model. The reference pattern is, e.g., the HMM customarily used in speech recognition. The model unit is "triphone", which is a sequence of three phonemes, or a "monophone", which is a single phoneme.

The speech data memory 12 is e.g. a hard disc device or a memory, and has stored therein feature data of larger numbers of utterances. These utterances may be speech data used in training (learning) a reference pattern, or speech data for development provided for targets of speech recognition with the use of the reference pattern. The features are speech waveform data, routinely used for speech recognition, and which have been processed with cepstrum analysis. The speech data are in time series and expressed by the equation 1.

The teacher label memory 11 is e.g. a hard disc device or a memory, and has stored therein correct solution teacher labels for the speech data stored in the speech data memory 12. In case of using HMM as the reference pattern, the correct solution teacher labels are each a correct solution HMM sequence for the speech data stored in the speech data memory 12. This sequence may, for example, be a model unit sequence at each time, a status sequence that constitutes the HMM, or a Gaussian distribution sequence that constitutes the HMM. These correct solution teacher labels may, for example, be those sequences selected as being most likely by the Viterbi algorithm and time-correlated with reference to speech data. The Viterbi algorithm is discussed in detail in Non-Patent Publication 1. The teacher labels are expressed in the time series in accordance with the equation 2.

The extraction side speech recognition means 13, as an instance of an extraction side speech recognition section, performs the processing of speech recognition on data stored in the speech data memory 12, using the reference patterns stored in the reference pattern memory 15, and outputs the results of the processing.

The recognition error knowledge extraction means 14, as an instance of a recognition error knowledge calculating section, performs statistical analysis of data stored in the speech data memory 12, using the correct solution teacher labels stored in the teacher label memory 11 and the results of recognition as obtained by the extraction side speech recognition means 13, that is, the recognition result label including errors, in order to extract the knowledge about the tendency towards recognition errors. The recognition error knowledge extraction means causes the so extracted knowledge to be stored in the recognition error knowledge memory 16.

The recognition error knowledge memory 16 is, e.g., a hard disc device or a memory etc.

The error-including recognition result labels, calculated from the results of the speech recognition, are represented in the time series in accordance with the equation (5):

$$L'=[l'(1),l'(2),\ldots,l'(T)] \qquad \text{[Equation 5]}$$

When the sequence of the results of recognition that ranks first is selected as the label, l'(t) is expressed as q=l'(t) in case the teacher label is q at time t.

Alternatively, when the candidate of any of the sequences of the results of recognition up to the sequence that ranks M'th is used, the teacher label of the candidate that ranks i'th at time t, is represented by qi, for example, and is expressed by the following equation (6):

$$[q1,q2,\ldots,qM]^t=l'(t) \qquad \text{[Equation 6]}$$

where a superscript t denotes transposed. This notation is to have the same meaning when used hereinbelow.

The recognition error knowledge extraction means 14 calculates the conditional probability that the correct solution teacher label y occurs under the condition that the recognition result label x is obtained as the statistic information, in accordance with, for example, the equation (7):

$$P(y\mid x) = \frac{\sum_t \delta(y, l(t))}{\sum_t \delta(x, l'(t))} \qquad \text{[Equation 7]}$$

where δ(y,l(t)) denotes 1 or 0 in case the label l(t) at time t is y or if otherwise, respectively. In case candidates up to the M'th candidate of the results of recognition are used, x may be represented by the following equation (8):

$$x=[x1,x2,\ldots,xM]^t \qquad \text{[Equation 8]}$$

By extracting and storing the knowledge about the recognition errors, in this manner, it is possible to extract and save the tendency towards errors (error tendency) of the speech recognition resulting from the use of the reference pattern of interest.

The reference pattern adaptation device 2 is, e.g., a personal computer, and includes a reference pattern memory 15, a recognition error knowledge memory 16, a speech data input section 17, a speech recognition means 18, an adaptation data calculating means 19, a reference pattern adaptation means 20 and an adaptation pattern memory 21.

The reference pattern memory 15 and the recognition error knowledge memory 16 are, e.g., hard disc devices or memories, and hold the same data as those held by the recognition error knowledge extraction device 1. It is however unnecessary for the reference pattern memory and the recognition error knowledge memory to be of the same device type as the recognition error knowledge extraction device.

The speech data input section 17 receives feature-analyzed speech data from the computer, or another computer, over a network, thereby receiving a feature amount string of the speech to be used for adaptation (input speech data). The feature amount is the same as those used in the recognition error knowledge extraction device 1 referred to above. The so input speech data are represented by the above equation 1.

The speech recognition means 18 performs the processing of speech recognition on the speech data, received by the speech data input section 17, using the reference patterns stored in the reference pattern memory 15. The speech recognition means outputs the results of speech recognition (recognition result teacher label).

The adaptation data calculating means 19 calculates the adaptation data, which take speech recognition errors into account, using the speech data received by the speech data input section 17, the results of recognition, output from the speech recognition means 18, that is, error-corrupted labels, and the recognition error knowledge, stored in the recognition error knowledge memory 16 and extracted by the recognition error knowledge extraction device 1.

For instance, using the speech data of the equation 1, the recognition result label of the equation 5 and the recognition error knowledge of the equation 7, the adaptation data is calculated in accordance with the following equations 9 and 10:

$$u(y) = \sum_t P(y \mid l'(t)) o(t) \quad \text{[Equation 9]}$$

And $$n(y) = \sum_t P(y \mid l'(t)) \quad \text{[Equation 10]}$$

where u(y) denotes integrated (summed-up) adaptation data used for adaptation of the label y, n(y) denotes the total number of the data. That is, the input speech data and the result of speech recognition are corrected by the recognition error knowledge, extracted beforehand, to yield corrected adaptation data.

If a corrected covariance matrix, used for adaptation of the label y, is used, the equation (11) may be used:

$$c(y) = \frac{1}{n(y)} \sum_t (P(y \mid l'(t)) o(t) - m(y))(P(y \mid l'(t)) o(t) - m(y))^t \quad \text{[Equation 11]}$$

where m(y) is a mean value of u(y) represented by the following equation (12):

$$m(y) = \frac{u(y)}{n(y)} \quad \text{[Equation 12]}$$

The reference pattern adaptation means 20, as an instance of the reference pattern adaptation section, uses data for adaptation, as corrected by the recognition error knowledge obtained by the adaptation data calculating means 19, for adapting the reference pattern stored in the reference pattern memory 15. The resulting reference pattern is stored in the adaptation pattern memory 21.

The adaptation pattern memory 21 is e.g. a hard disc device or a memory. In a method for adapting the reference pattern, for example, in case the Gaussian distribution sequence is used as a teacher label and its mean vector is adapted by Maximum A Posteriori (MAP) adaptation, the mean vector of the Gaussian distribution of the label y may be adapted in accordance with the following equation (13):

$$\mu'(y) = \frac{n(y)}{\tau + n(y)} u(y) + \frac{\tau}{\tau + n(y)} \mu(y) \quad \text{[Equation 13]}$$

where τ is a control constant having a value not smaller than 0.

The operation of the reference pattern adaptation system 3 is now described.

FIG. 2(a) depicts a flowchart for illustrating the operation of the recognition error extraction device 1. Using the reference pattern stored in the reference pattern memory 15, the extraction side speech recognition means 13 performs the processing of speech recognition on the data stored in the speech data memory 12 (step S101).

Using the correct solution teacher label, stored in the teacher label memory 11, and also using the recognition results, obtained in the step S101, the recognition error knowledge extraction means 14 extracts the recognition error knowledge, and causes the so extracted recognition error knowledge to be stored in the recognition error knowledge memory 16 (S102).

FIG. 2(b) depicts a flowchart for illustrating the operation of the reference pattern adaptation device 2. The feature amounts (data) of the speech, used for adaptation, are delivered to the speech data input section 17 (S111).

Using the reference patterns stored in the reference pattern memory 15, the speech recognition means 18 performs the processing of speech recognition on the input data, and outputs the results of the recognition to the adaptation data calculating means 19 (S112).

Using the speech data, delivered in the step S111, the results of the recognition, obtained in the step S112, and the recognition error knowledge, obtained in the step S102, the adaptation data calculating means 19 calculates the adaptation data corrected for the speech recognition error (step S113).

The reference pattern adaptation means 20 adapts the reference patterns, using the adaptation data obtained in the step S113, and causes the so adapted pattern to be stored in the adaptation pattern memory 21 (S114).

The adaptation data, obtained by calculations by the adaptation data calculating means 19, is the adaptation data corrected using the results of speech recognition of the input speech data and also using the speech recognition error knowledge extracted beforehand. Thus, if the adaptation data is used for adapting the reference patterns, not only data the results of recognition of which represent the correct solution, but also data the results of recognition of which were in error, and which are then corrected with the recognition error knowledge, may be used. Thus, the information of the input speech data may be exploited sufficiently. Moreover, even in case the recognition performance of the original (or initial) reference patterns is low, the reference patterns may be adapted effectively through use of the recognition error knowledge.

Moreover, according to the present invention, the corrected adaptation data are calculated by the adaptation data calculating means 19 as the adaptation data for the respective labels. Hence, only small constraints are imposed on the techniques for adaptation of the reference patterns, such that not only pre-existing techniques for reference pattern adaptation, that is, MAP adaptation, but also other techniques, such as MLLR, AMCC, Eigenvoice or HEV adaptations, may be used. These adaptation techniques are described in detail in Non-Patent Publications 2 and 3.

A reference pattern adaptation system 6, as a second exemplary embodiment of the present invention, is now described with reference to the drawings. Since the formulation of the reference pattern adaptation system 6 has many parts or components in common with those of the reference pattern adaptation system 3 of FIG. 1, the common parts or components are indicated by the same reference numerals or symbols as those used in FIG. 1, and detailed description therefor is dispensed with.

Figure 3:
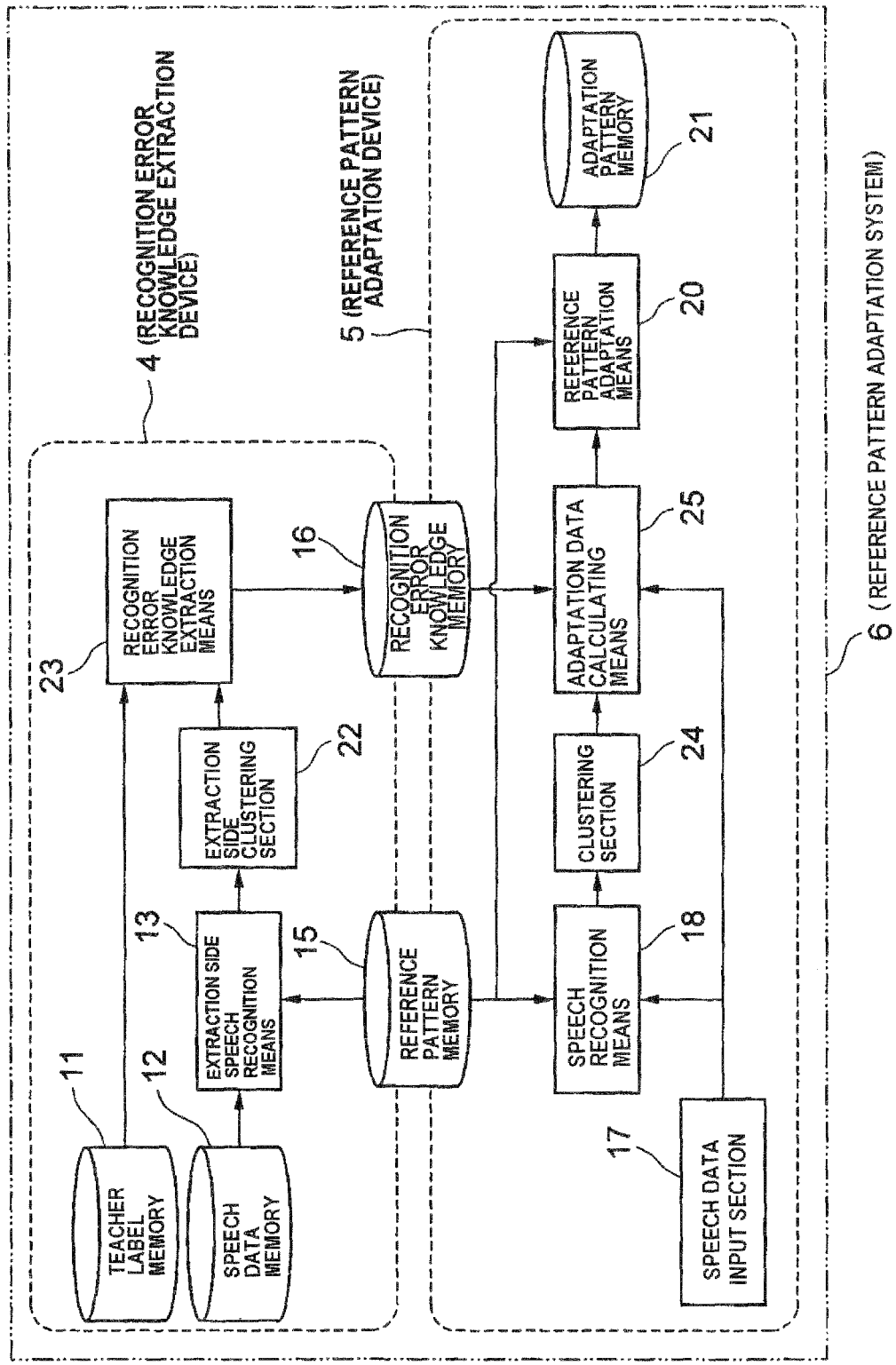
FIG. 3 is a schematic view showing a formulation of a reference pattern adaptation system according to a second exemplary embodiment of the present invention.
Figure 6:
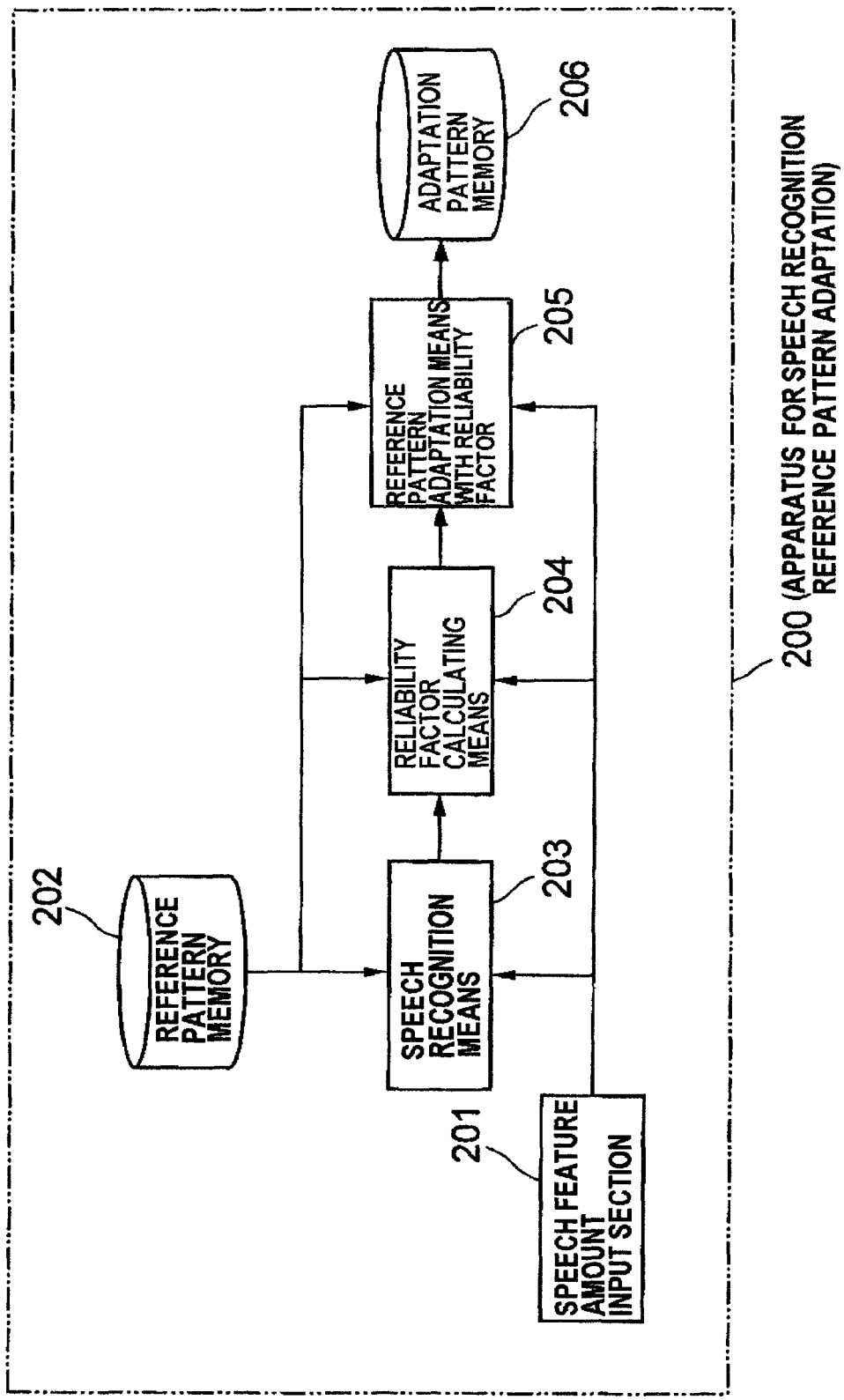
FIG. 6 is a schematic view showing a formulation of a reference pattern adaptation device disclosed in a related art.

The reference pattern adaptation system 6, shown in a block diagram of FIG. 3, includes a recognition error knowledge extraction device 4 and a reference pattern adaptation device 5. The recognition error knowledge extraction device 4 and the reference pattern adaptation device 5, respectively, include an extraction side clustering section 22 and a clustering section 24, in addition to the basic components which are the same as those of the corresponding devices shown in FIG. 1.

The extraction side clustering section 22 calculates the cluster labels of the equation 14 time-correlated to the recognition result label of the equation 5, speech data of the equation 1 and the teacher label of the equation 2 to effect classifying into clusters.

$$K'=[k'(1),k'(2),\ldots,k'(T)] \quad \text{[Equation 14]}$$

In case the speed of utterance, estimated from the results of the speech recognition, is used for clustering, the cluster labels are each an array of the mora numbers per unit time for respective time points t. The cluster labels may also be formed by sampling estimated values of the speed of utterances, as continuous values, into discrete values. Alternatively, the extraction side clustering section 22 may be formulated as shown in FIG. 4 for classifying the labels into plural clusters of analogous speakers. In the latter case, the speeches of many speakers are modeled beforehand from one speaker to another based on a normal distribution. These speeches of the different speakers are classified into clusters each formed by a plurality of analogous speakers, by, e.g., the K-averaging method, with the distances between the respective normal distributions as index. As the distances between the respective normal distributions, the Bhattachrrya distance of, for example, the equation 15, is used:

$$D(N(\mu 1, \Sigma 1), N(\mu 2, \Sigma 2)) = \quad \text{[Equation 15]}$$
$$\frac{1}{8}(\mu 1-\mu 2)^t \left[\frac{\Sigma 1+\Sigma 2}{2}\right]^{-1}(\mu 1-\mu 2) + \frac{1}{2}\ln\frac{\left|\frac{\Sigma 1+\Sigma 2}{2}\right|}{|\Sigma 1|^{1/2}|\Sigma 2|^{1/2}}$$

where N denotes the normal distribution, its mean vector being µ1 and the covariance matrix being Σ1. The K-averaging method is described in detail in Non-Patent Publication 1.

The data of each class of analogous speakers, obtained on clustering, are modeled in accordance with the sole normal distribution or the hybrid normal distribution which is the weighted sum of a plurality of normal distributions. The resulting models of the analogous speakers are stored in an analogous speaker model memory 26 of FIG. 4. A cluster label calculating section 27 finds the scores with respect to the model of analogous speakers, stored in the analogous speaker model memory 26, at each time instant or for each utterance of the input speech data of the equation 1. The cluster label calculating section adopts the analogous speaker model with the highest degree of analogousness as a cluster label.

If the sole normal distribution or the hybrid normal distribution is used, for example, as the model of the analogous speaker, the likelihood for the speech data is used as the score. Alternatively, the labels are clustered based on the reliability factor of the result of speech recognition. For example, the a-posteriori probability of the label of the result that ranks first is used, using the label of the results of speech recognitions up to the M'th position.

If any of the labels of the results of recognition up to the M'th position at a given time point is expressed by the equation 8, and the log likelihood thereof is represented by the equation 16:

$$f=[f1,f2,\ldots,fM]^t \quad \text{[Equation 16]}$$

the reliability factor of the result of speech recognition that ranks first is expressed by the equation 17:

$$k'(t) = \frac{\sum_i \delta(x1, xi)\exp(fi)}{\sum_i \exp(fi)} \quad \text{[Equation 17]}$$

This reliability factor is used as a cluster label.

The continuous values of the results of the speech recognition may be sampled to form discrete values which may then be used as the cluster labels. Alternatively, a plurality of conditions, such as the speed of utterance, analogous speakers or the speech recognition reliability factor, or the like may be combined and used as cluster labels.

A recognition error knowledge extraction means 23 is similar to the corresponding means in FIG. 1. However, the recognition error knowledge extraction means 23 performs the operation of the error knowledge extraction from one cluster label to another. That is, the speech recognition error knowledge is modified, as the knowledge for each cluster k, to a form represented in, e.g. the equation 18:

$$P_k(y \mid x) = \frac{\sum_t \delta(y, l(t))\delta(k, k'(t))}{\sum_t \delta(x, l'(t))\delta(k, k'(t))} \quad \text{[Equation 18]}$$

The clustering section 24 performs the same operation as that of the above-described extraction side clustering section 22. An adaptation data calculating means 25 performs the operation similar to that performed by the adaptation data calculating means 19 of FIG. 1, using the speech recognition error knowledge, extracted from each cluster, stored in the recognition error knowledge memory 16. That is, the adaptation data, delivered to the speech data input section 17, is corrected from the recognition result label of the equation 5 and from the cluster label of the equation 14, using the cluster-based (cluster by cluster) recognition error knowledge of the equation 18.

The operation of the reference pattern adaptation system 6 is now described with reference to the flowchart of FIG. 5(*a*) showing the operation of the recognition error knowledge extraction device 4. The extraction side speech recognition means 13 performs the processing of speech recognition on data stored in the speech data memory 12, using the reference patterns stored in the reference pattern memory 15 (S121).

The extraction side clustering section 22 classifies into clusters the speech data and the results of speech recognition generated in the step S121 (S122). Specifically, the cluster labels, time-correlated with the speech data, teacher labels and the recognition result label, are calculated.

The recognition error knowledge extraction means 23 performs the operation of extracting the error knowledge from one cluster level to another (S123). That is, the speech recognition error knowledge, shown for example by the equation 18, is calculated as the cluster-based knowledge.

FIG. 5(*b*) depicts a flowchart for illustrating the operation of the reference pattern adaptation device 5. The feature amount (data) of the speech, used for adaptation, is delivered from the speech data input section 17 (S131).

The speech recognition means 18 performs the operation of speech recognition on the input data, using the reference patterns stored in the reference pattern memory 15, and delivers the results of the recognition to the adaptation data calculating means 25 (S132).

The clustering section 24 classifies into clusters the speech data and the results of the speech recognition generated in the step S131 (S133).

The reference pattern calculation means 25 calculates adaptation data corrected for the speech recognition error (S134), using the speech data, delivered in the step S131, the results of the recognition, obtained in the step S132 and the cluster-based recognition error knowledge, obtained in the step S133.

Using the adaptation data, obtained in the step S134, the reference pattern adaptation means 20 adapts the reference patterns, and causes the resulting adaptation pattern to be stored in the adaptation pattern memory 21 (S135).

In the reference pattern adaptation system 6, the speech recognition error knowledge is extracted in greater detail as a result of clustering which is based on the speed of utterance, speaker property and the factor of reliability of the results of the recognition etc. Since the adaptation data may properly be corrected in this way, reference pattern adaptation may be accomplished more effectively.

INDUSTRIAL RELIABILITY

According to the present invention, the reference patterns for speech recognition may be adapted to the features of the user's voice, without the user being conscious of it, in such a way as to improve the speech recognition performance. The present invention thus lends itself to such applications as a speech recognition apparatus or as a program for implementing the speech recognition apparatus on a computer.

The particular exemplary embodiments or examples may be modified or adjusted within the framework of the entire disclosure of the present invention, inclusive of claims, based on the fundamental technical concept of the invention. Further, variegated combinations or selection of elements disclosed herein may be made within the framework of the claims.

The invention claimed is:

1. A method for adapting a reference pattern, comprising:
  a speech recognition step of calculating a recognition result teacher label using input speech data and a reference pattern;
  an adaptation data calculating step of calculating adaptation data composed of speech data and a teacher label, said adaptation data being composed of said input speech data and said recognition result teacher label corrected for adaptation by multiplying recognition error knowledge which is statistical information calculated as a conditional probability, wherein the conditional probability is a ratio of correct recognitions divided by a total of recognitions; and
  a reference pattern adaptation step of adapting said reference pattern using said adaptation data to generate an adaptation pattern.

2. The method for adapting a reference pattern according to claim 1 further comprising:
  an extraction side speech recognition step of recognizing the speech from said speech data, prior to said adaptation data calculating step, to calculate a recognition result label; and
  a recognition error knowledge calculating step of statistically analyzing a correct solution teacher label, which comprises an error-free teacher label and said recognition result label, to calculate said recognition error knowledge.

3. The method for adapting a reference pattern according to claim 1 further comprising:
  a clustering step of classifying said input speech data and said recognition result teacher label each into a plurality of clusters;
  said adaptation data calculating step calculating said adaptation data, by a cluster-based recognition error knowledge, using said input speech data classed into said clusters and said recognition result teacher label each classified into said clusters.

4. The method for adapting a reference pattern according to claim 3 further comprising:
  an extraction side speech recognition step of recognizing the speech from said speech data, prior to said adaptation data calculating step, to calculate a recognition result label;
  an extraction side clustering step of classifying said speech data and said recognition result label each into a plurality of clusters; and
  a recognition error knowledge extracting step of statistically analyzing a correct solution teacher label, which comprises an error-free teacher label and said recognition result teacher label, and calculating the recognition error knowledge which is the statistical information of the tendency towards recognition errors of said reference pattern.

5. A non-transient computer-readable medium storing a reference pattern adaptation program for causing a computer to execute:
  a speech recognition function of calculating a recognition result teacher label using input speech data and a reference pattern;
  an adaptation data calculating function of calculating adaptation data composed of speech data and a recognition result teacher label, said adaptation data being composed of said input speech data and said recognition result teacher label corrected for adaptation by multiplying recognition error knowledge which is statistical information calculated as a conditional probability, wherein the conditional probability is a ratio of correct recognitions divided by a total of recognitions; and
  a reference pattern adaptation function of adapting said reference pattern using said adaptation data to generate an adaptation pattern.

6. The non-transient computer-readable medium storing a reference pattern adaptation program according to claim 5 for causing a computer to further execute:
  an extraction side speech recognition function of recognizing the speech from said speech data, prior to said adaptation data calculating function, to calculate a recognition result label; and
  a recognition error knowledge calculating function of statistically analyzing a correct solution teacher label, which comprises an error-free teacher label and said recognition result label, to calculate said recognition error knowledge.

7. The non-transient computer-readable medium storing a reference pattern adaptation program according to claim 5 for causing a computer to further execute:
  a clustering function of classifying said input speech data and said recognition result teacher label each into a plurality of clusters;
  said adaptation data calculating function calculating said adaptation data, by a cluster-based recognition error knowledge, using said input speech data and said recognition result teacher label each classified into said clusters.

8. The non-transient computer-readable medium storing a reference pattern adaptation program according to claim 7 for causing a computer to further execute:
- an extraction side speech recognition function of recognizing the speech from said speech data, prior to said adaptation data calculating function, to calculate a recognition result label;
- an extraction side clustering function of classifying said speech data and said recognition result label each into a plurality of clusters; and
- a recognition error knowledge extracting function of statistically analyzing a correct solution teacher label, which comprises an error-free teacher label and said recognition result teacher label, to calculate the recognition error knowledge which is the statistical information of the tendency towards recognition errors of said reference pattern.

9. An apparatus for adapting a reference pattern, comprising:
- a speech recognition device that calculates a recognition result teacher label using input speech data and a reference pattern;
- an adaptation data calculating device that calculates adaptation data composed of a recognition result teacher label and speech data, said adaptation data being composed of said input speech data and said recognition result teacher label, corrected for adaptation by multiplying recognition error knowledge which is statistical information calculated as a conditional probability, wherein the conditional probability is a ratio of correct recognitions divided by a total of recognitions; and
- a reference pattern adaptation device that adapts said reference pattern using said adaptation data to generate an adaptation pattern.

10. The apparatus for adapting a reference pattern according to claim 9 further comprising:
- an extraction side speech recognition device that recognizes the speech from said speech data to calculate a recognition result label; and
- a recognition error knowledge calculating device that statistically analyzes a correct solution teacher label, which comprises an error-free teacher label and said recognition result label, to calculate said recognition error knowledge.

11. The apparatus for adapting a reference pattern according to claim 9 further comprising:
- a clustering device that classifies said input speech data and said recognition result teacher label each into a plurality of clusters;
- said adaptation data calculating device calculating said adaptation data, by a cluster-based recognition error knowledge, using said input speech data and said recognition result teacher label each classified into said clusters.

12. The apparatus for adapting a reference pattern according to claim 11 further comprising:
- an extraction side speech recognition device that recognizes the speech from said speech data to calculate a recognition result label;
- an extraction side clustering device that classifies said speech data and said recognition result label each into a plurality of clusters; and
- a recognition error knowledge extracting device that statistically analyzes a correct solution teacher label, which comprises an error-free teacher label and said recognition result label, to calculate the recognition error knowledge which is the statistical information of the tendency towards recognition errors of said reference pattern.

* * * * *